INVENTORS
FRANK S. PEARNE,
& FREDERICK G. ROBSON
BY
McNENNY, FARRINGTON, PEARNE & GORDON
ATTORNEYS

Jan. 6, 1970   F. S. PEARNE ET AL   3,487,954
HACKER

Filed Nov. 2, 1966   7 Sheets-Sheet 7

INVENTORS
FRANK S. PEARNE,
& FREDERICK G. ROBSON
BY
McNENNY, FARRINGTON, PEARNE, & GORDON

ATTORNEYS

United States Patent Office 3,487,954
Patented Jan. 6, 1970

3,487,954
HACKER
Frank S. Pearne, San Gabriel, and Frederick G. Robson, Long Beach, Calif., assignors to Pearne and Lacy Machine Company Inc., Los Angeles, Calif., a corporation of California
Filed Nov. 2, 1966, Ser. No. 591,554
Int. Cl. B65g 57/00
U.S. Cl. 214—6     12 Claims

ABSTRACT OF THE DISCLOSURE

An automated machine for the manufacture of bricks is disclosed wherein the brick material is extruded from a pug mill onto a table and through a cutter which operates intermittently to cut the extruded material into slugs of pedetermined lengths. An off-bearing belt carries the slugs to a cutter and hacker assembly mounted on a carriage which is located above a kiln car. The carriage is reciprocable lengthwise of the off-bearing belt and laterally with respect to the movement of the kiln car. The pusher cycles intermittently to first move a slug from the off-bearing belt to a table, and subsequently to move the next slug from the off-bearing belt a greater distance so as to push the two slugs through a cutter which cuts each slug into a plurality of articles forming a column and to also push two prior cut columns onto a setter. The setter grasps each column, separates the columns a predetermined distance, rotates the two separated columns from a horizontal to a vertical position, and sets them on a kiln car. The carriage is then indexed and the next two columns are set on the kiln car. When two complete parallel rows of brick have been set across the width of the kiln car in this manner, the car is moved forward to receive the next pair of rows. When glazed bricks are being manufactured, a separator separates cut and glazed brick into columns each consisting of a predetermined number of brick. A pusher then moves a single column of glazed brick onto a setter assembly which inverts and offsets alternate bricks in the column and subsequently rotates the inverted and offset column to set them on the kiln car.

---

This invention relates generally to the manufacture of articles such as bricks, tile, or the like, and more particularly to a novel and improved automated machine for such manufacture.

A machine incorporating this invention completely eliminates all manual operations in the forming, handling and firing or burning of articles, such as bricks, tile, or the like. In one illustrated embodiment the material for the bricks or tile is extruded onto an off-bearing belt and cut into slugs or columns of predetermined length. The slugs are carried by the off-bearing belt to a cutter and hacker assembly mounted on a carriage which is located above a kiln car and which is movable across the kiln car lengthwise of the off-bearing belt. The cutter and hacker assembly includes means to cut the slugs into a plurality of aligned and abutting articles which cooperate to form an elongated column of articles. Two columns are automatically positioned on a setter which turns the columns upright and positions the upright columns on a kiln car in a predetermined pattern selected to provide uniform burning of the individual articles.

The carriage is moved along the off-bearing belt and laterally with respect to the kiln car each time the setter positions two columns of articles on the kiln car. This movement positions the setter so that it can place the next pair of columns in a position spaced from the preceding pair by uniform distance. The setter also operates to separate each column from the other column of the pair by uniform distance. This operation continues until two rows of upright columns extend completely across the kiln car.

An indexing mechanism is provided to then move the car forward so that it is positioned to receive the next two rows of columns and the carriage moves back across the car to its initial position so that the cutter and hacker assembly can repeat its operation and position an additional two pairs of upright columns on the kiln car.

The machine is arranged to automatically cycle until the kiln car is fully loaded and then repeat its operation on the next car. In one illustrated machine each column contains ten bricks and the kiln cars are set in a grid pattern having fifteen columns across the car and twelve columns lengthwise of the car. Consequently, each kiln car is set with eighteen-hundred bricks. Of course the number of columns that can be set on a given kiln car is determined by the size of the brick and the size of the car. Also, the number of articles in each column is determined by the size and shape of the articles. Taller columns can be used if tie clamps are placed on the tops of the columns to provide stability. After the kiln cars are loaded it is customary to move the loaded cars through a dryer, a preheater and a kiln where the bricks or other articles are fired.

In another illustrated embodiment of this invention previously formed glazed brick are carried by a conveyor to a hacker assembly mounted on a carriage which is movable lengthwise of the conveyor across the kiln car. Means are provided to form groups or columns of such glazed brick which are in an abutting relationship and are spaced from other columns moving along the conveyor. Each column includes a predetermined number of bricks glazed on one end and one face. The hacker assembly is again arranged to turn the columns upright and position them on the kiln car in a predetermined grid-like pattern. Because the bricks are already cut this embodiment does not require a cutter. However, an inverter mechanism is provided to invert and offset alternate bricks in each column and to space the glazed surfaces of each brick from the adjacent brick. This insures that the glaze will not be damaged and will not bond the fired brick together.

In one of its broader aspects the present invention provides a novel and improved machine for setting columns on a platform such as a kiln car. Such machine can be supplied directly from a cutter as described with reference to the first embodiment or can be supplied with previously formed, glazed or unglazed articles. In either event the machine permits the automated loading of kiln cars, or the like, with a large number of articles uniformly spaced and uniformly handled so that high production rates can be achieved with a minimum waste or damage. The structure and mechanisms for producing this improved operation is simplified compared with other arrangements having similar production rates, so the initial cost of the machine and the maintenance expense is minimized. Further, since the articles are set on the platform or kiln car in vertical columns having a relatively large number of articles in each column, there is a minimum possibility of damage to the articles during the forming and setting operations and a minimum of downgrading of the product results.

It is an important object of this invention to provide a novel and improved machine for the automatic setting of articles such as bricks, tile, or the like, on a platform in upright columns wherein each column consists of a plurality of articles.

It is another important object of this invention to provide a machine according to the last preceding object arranged to produce slugs of uniform length and thereafter cut the slugs into individual articles forming the columns which are subsequently set upon a kiln car or the like.

It is another important object of this invention to provide a novel and improved machine according to the first preceding object operable to group previously formed articles into columns having predetermined numbers of aligned and abutting articles and thereafter operable to set the columns on a kiln car or the like.

It is still another object of this invention to provide a novel and improved machine, according to the last preceding object, operable to position alternate articles in an offset relationship within the columns.

It is still another object of this invention to provide a machine operable to cut elongated slugs into a plurality of similar articles, such as bricks or the like, and thereafter set the columns in upright positions on the kiln car, or the like, in a predetermined grid arrangement wherein the setting mechanism performs its function simultaneously on more than one column.

Further objects and advantages will appear from the following description and drawings; wherein.

FIGURE 7 is a schematic plan view of another modification of the embodiment of FIGURES 1 through 5 which is adapted to form and set soil tile or the like;

In each of the figures frame members and other structural elements have been cutaway and in some cases eliminated to simplify the illustration of the machine and to facilitate the understanding of the structure and operation of the various embodiments of the machine.

FIGURES 1 through 5 all illustrate an embodiment of a machine incorporating the present invention which completely automates the forming, cutting and setting of the bricks. This machine operates to set a kiln car with a plurality of columns of bricks arranged in a grid-like pattern wherein each column includes ten individual brick. The material for forming the brick is extruded from a pug mill 12 as a continuous column 10 having a cross section arranged so that the column may be cut into individual bricks to complete the formation of the bricks. This column 10 slides along a table 11 as it is extruded out of the pug mill 12 and passes through a bow cutter 13 onto an off-bearing belt 14. The bow cutter 13 operates automatically to cut the column into slugs 16 of predetermined length. In the illustrated machine the slugs 16 are sized so that they may be subsequently cut into ten individual bricks, leaving a sufficient amount of scrap at each end to insure that the end bricks are squarely cut.

The off-bearing belt 14 is operated at a surface speed higher than the rate of extrusion of the column 10 so that each slug 16 is moved away from the material which will be cut into the subsequent slug and a space is provided between adjacent slugs as they are carried along the off-bearing belt 14. The off-bearing belt 14 is driven by a drive pulley 17 located at one end thereof and powered by a motor 18. Tension means 19 are provided at the other end of the off-bearing belt and the two flights or reaches of the belt 14 are supported by plates 21 (illustrated in FIGURE 3).

The off-bearing belt 14 extends through a cutter and setter carriage 22 and across a kiln car 23. The kiln car 23 is supported on tracks 24 and is automatically indexed along the tracks by an indexing mechanism 26 in a manner timed with the operation of the machine as described in detail below. Reference may be made to the co-pending application Ser. No. 545,613, filed Apr. 27, 1966, for a detailed description of the indexing mechanism 26.

The cutter and setter carriage 22 is supported for movement lengthwise of the off-bearing belt 14 and across the kiln car 23 on rollers 27 which roll along frame members 28 formed of angle iron. The power for moving the cutter and setter carriage along the frame members 28 is provided by an actuator including a cylinder 29 mounted on the machine frame and a piston 31 connected to the cutter and setter carriage.

The stroke of the piston 31 is arranged so that when the piston is extended the cutter and setter carriage 22 is positioned to set a pair of columns of bricks adjacent to one edge of the kiln car and when the piston is retracted the cutter and setter carriage is positioned to set a pair of columns of bricks adjacent to the opposite edge of the kiln car. The piston 31 is operated in a step-by-step manner to progressively move the carriage through a series of setting positions until fifteen pairs of columns are positioned in an upright manner across the kiln car. The indexing mechanism 26 then moves the car forward and the piston 31 extends to again position the carriage for setting columns adjacent to the far edge of the kiln car and a subsequent fifteen pairs of columns are set across the kiln car. Such cycles are continued until a given kiln car is fully loaded and then subsequent kiln cars are automatically loaded.

Mounted on the cutter and setter carriage is a stop bar 32 extending across the upper flight of the off-bearing belt and positioned to engage the end of a slug carried along the off-bearing belt 14 when the slug is in proper position within the cutter and setter carriage 22. When such slug engages the stop bar 32 it is held against further movement with the off-bearing belt 14.

A pusher 33 is carried by the carriage 22 for lateral movement across the off-bearing belt 14 toward a cutter frame 34. The pusher is operated by an actuator including a cylinder 36 mounted on the carriage and a piston 37 connected to the pusher 33. Extension of the piston 37 causes the pusher 33 to engage a slug 16 resting against the stop bar 32 and push such slug laterally off the off-bearing belt 14 onto a table 40. The table 40 extends through the cutter frame 34 to a position adjacent to a setter assembly 38.

The cutter frame 34 is provided with eleven cutting wires 39 each of which is connected at its lower end to a cross member 41 and at its upper end to a tensioning spring 42. The cutter wires are parallel to each other and spaced from each other by a distance equal to the required height of each brick. The wires 39 are positioned so that a slug pushed past the cutter wires is cut into ten individual bricks.

The slugs 16 are sized so that a small amount of scrap is provided at each end to insure that the end bricks are squarely and evenly cut. The table 40 has a length arranged so that the scrap at the ends of the columns falls over the ends of the table to a scrap conveyor 43 which carries the scrap out of the machine so that it may be collected and returned to the pug mill 12 for re-extrusion. Consequently, the scrap is reprocessed and there is no material waste.

Figure 1:
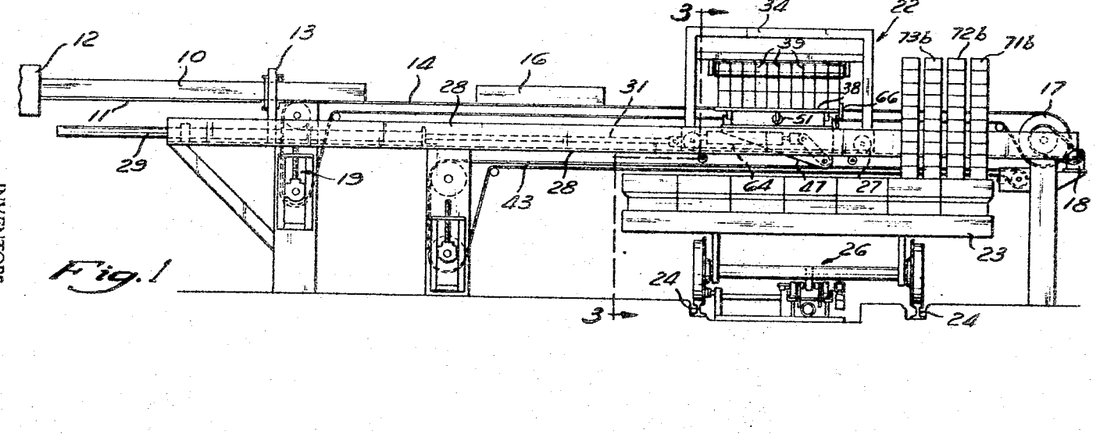
FIGURE 1 is a side elevation of one embodiment of this invention arranged to form bricks and automatically operable to set columns of bricks in an upright manner on a kiln car.
Figure 2:
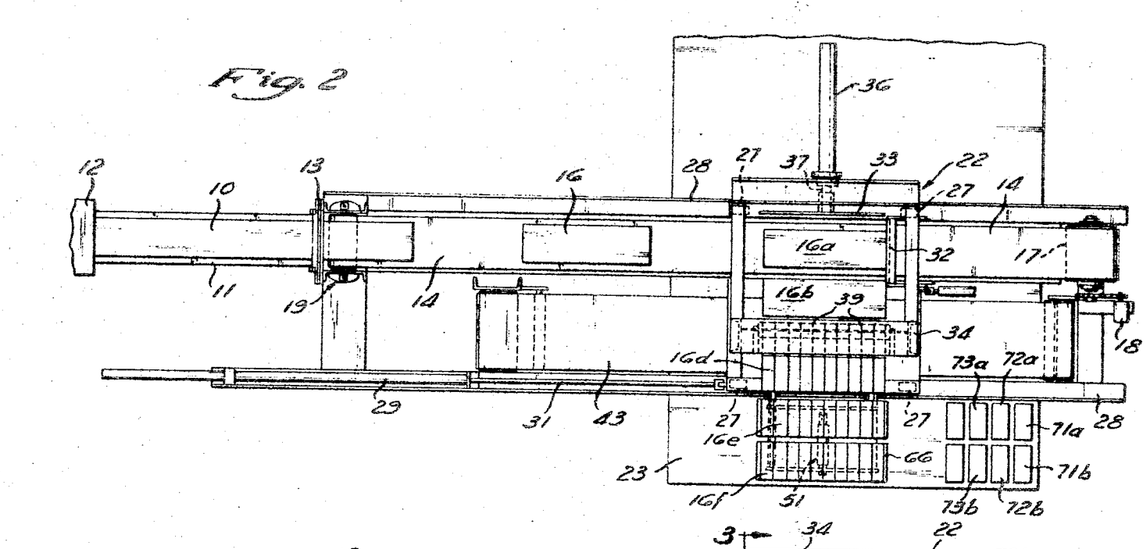
FIGURE 2 is a plan view of the apparatus illustrated in FIGURE 1.
Figure 3:
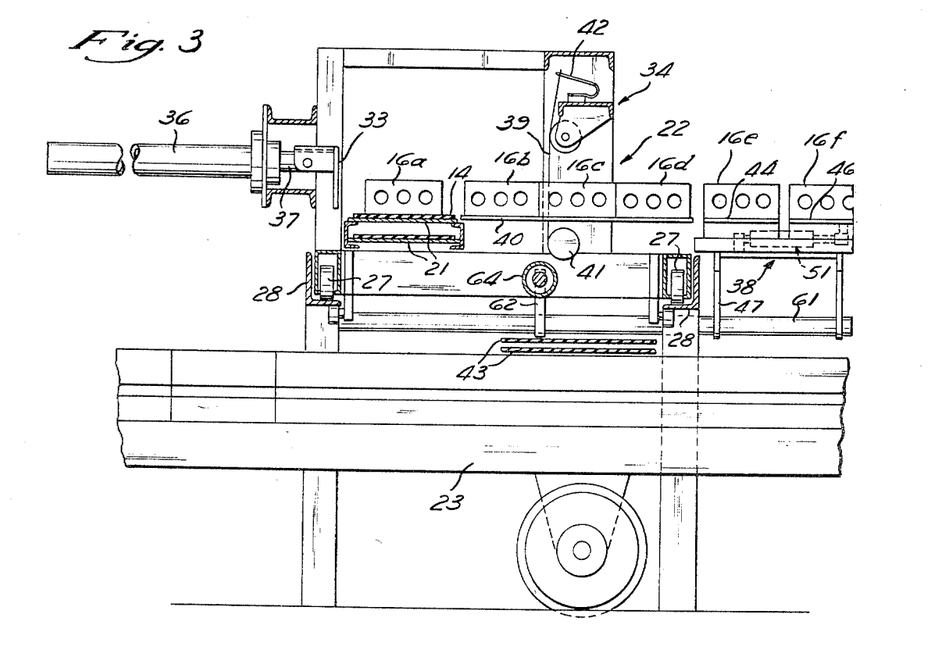
FIGURE 3 is an enlarged, fragmentary, side elevation, with certain parts broken away, taken generally along 3—3 of FIGURE 1 and illustrating the structure at the cutter and hacker position.
Figures 4, 5:
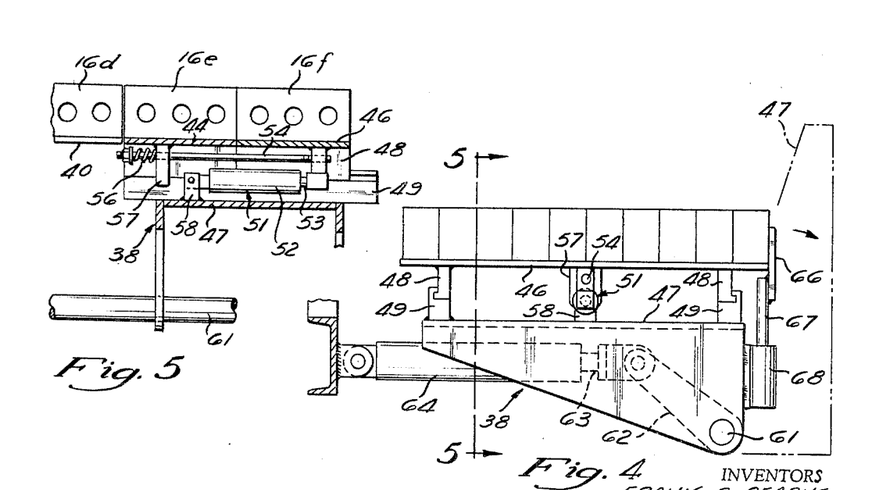
FIGURE 4 is an enlarged, fragmentary side elevation of the setter assembly illustrating the assembly in the position in which it receives a column of bricks.
FIGURE 5 is a fragmentary section taken generally along 5—5 of FIGURE 4, with parts removed, illustrating the structure of the spreader mechanism.

Mounted on the setter assembly 38 are first and second spreader plates 44 and 46, respectively. These plates are laterally movable relative to the setter assembly 38 from a closed position to an open or spread position. In FIGURE 5 the plates are illustrated in the closed and column receiving position. In this position the spreader plate 44 abuts the edge of the table 40 and the spreader plate 46 abuts the opposite edge of the spreader plate 44. When in the open position, illustrated in FIGURE 3, the spreader plates 44 and 46 are spaced from each other and from the table 40.

The spreader plates 44 and 46 are mounted on the frame 47 of the setter assembly 38, as best illustrated in FIGURE 4. Each of the plates is provided with a leg 48 substantially adjacent to each end which interfits with an upstanding rail 49 carried by the frame 7. An actuator 51 includes a cylinder 52 connected to the frame 47 and a piston 53 connected to a lug on the spreader plate 46. When the piston 53 is retracted, as illustrated in FIGURE 5, the spreader plates are closed and positioned against the table 40. When the piston 53 extends, the spreader plate 46 is moved to the right and through the action of a drawbolt 54 and spring 56 moves the spreader plate 44 to the right. The drawbolt 54 extends loosely through a depending arm 57 which engages the arm 58 when the desired maximum movement of the spreader plate 44 is achieved. Continued extension of the piston 53 then compresses the spring until the spring bottoms out to determine the maximum rightward movement of the spreader plate 46.

The frame 47 of the setter assembly 38 is mounted on a pivot bar 61 which is journaled on the carriage assembly 22 so that the setter can pivot between a position illustrated in FIGURE 4 in which the spreader plates are horizontal and a position illustrated in phantom in FIGURE 4 in which the spreader plates are vertical. An arm 26 is mounted on the pivot shaft 61 and is connected to the piston 63 of a piston and cylinder actuator 64. The various elements are proportioned so that when the piston is in the extended position the setter assembly is in the vertical position and when the piston is retracted the setter assembly is in the horizontal position illustrated in full line.

A retractable footplate 66 is carried by the piston 67 of an actuator 68. The footplate 66 engages the end brick resting on the spreader plates 44 and 46 and supports the two columns of bricks resting thereon as the setter assembly rotates to the vertical position. Retraction of the piston 67, however, operates to pull the endplate 66 clear of the columns of bricks.

The operation of the machine is as follows. The brick material is extruded from the pug mill 12 onto a table 11 and through the cutter 13. The cutter operates intermittently to cut slugs 16 of predetermined length. The off-bearing belt operates at a rate faster than the rate of extrusion, so spacing is provided between adjacent slugs 16 carried along the off-bearing belt 14 to the cutter and setter carriage 22. Initially the carriage is in the right hand extreme position, as viewed in FIGURES 1 and 2, so that the first pair of columns of brick will be positioned adjacent to one edge of the kiln car 23. Referring to FIGURE 3, when the slug in the position 16a engages the stop bar 32 the actuator 36 operates to push the slug to the position at 16b on the table 40. The pusher 33 then retracts before the subsequent slug 16 reaches the carriage 22. The subsequent slug in the position 16a is then pushed laterally off the off-bearing belt 14 by the pusher 33. However, in this stroke the pusher 33 is extended far enough to push the slug from the position of 16a to the position of 16c. This causes the slug at the position 16b to move to the position 16d. The slug at the position 16d has been cut by the wires 39 with the scrap from its ends falling onto the scrap belt 43 and the slug in the position 16a is partially through the wires 39. While this is occurring the spreader plates 44 and 46 are in the closed position of FIGURE 5 and the two slugs which were in the position 16c and 16d are pushed onto the two spreader plates in a position 16e and 16f. These slugs have been cut into ten bricks and the ten bricks cooperate to form columns which are set on end on the kiln car.

While the pusher is operating to move the subsequent slug to the position 16b the actuator 51 is extended to spread the spreader plates 44 and 46 to the position of FIGURE 3. The spreader plates are provided with vacuum openings and are connected to a source of vacuum so that the columns at 16e and 16f are gripped by vacuum and are held against the plates while the plates are turned to the vertical position. The actuator 64 then operates to tip the plates 44 and 46 with the columns carried thereby to the vertical position. This locates the two columns immediately above the surface of the car in an upright position. The actuator 68 is then operated to retract the footplate 66 and the vacuum is released so that the two columns drop about one-quarter of an inch and rest on the kiln car.

The actuators 64 and 51 are then retracted to return the setter assembly to its position of FIGURE 5 so that it can receive a subsequent pair of columns of bricks. While this is occurring the actuator 29 moves the entire cutter and setter carriage 22 to the left, as viewed in FIGURES 1 and 2, so that it is in position to set the subsequent pair of columns.

During the first cycle, the machine simultaneously positions columns at 71a and 71b adjacent to one edge of the kiln car 23. The next pair of columns are set at 72a and 72b. After these two columns are set the carriage is again indexed to the left, so that the pair of columns can be set at 73a and 73b. During each cycle of operation the carriage is moved one position to the left until the last pair of columns are set adjacent to the opposite edge of the kiln car.

It should be noted that in the first stroke of the pusher 33 in each cycle the slug is moved only from the off-bearing belt 14 to the position 16b on the table 40. In the next operation the pusher 33 extends a greater distance and pushes the column from the position 16a to the position 16c. Consequently, the setter assembly 38 operates at a cyclic rate equal to one-half of the cyclic rate of the pusher 33. Consequently, more time is available for the setting operation and the overall machine can be operated at a higher rate of speed.

When the first pair of rows of columns is set across the kiln car the kiln car indexing mechanism 26 moves the kiln car forward to position the kiln car to receive the next two pair of rows and the actuator 29 extends so that the setter carriage 22 is in position to set the following pair of rows across the car. In the illustrated machine each column contains ten bricks and there are fifteen columns across the car. Obviously, if wider kiln cars were used more columns could be provided. Also, if desired, columns having greater or lesser number of bricks could be set. Generally, if higher columns are desired tie plates should be placed across the tops of the columns for added stability. After the cars are loaded they are moved through the necessary burning furnaces and the like and after loading are reloaded with additional bricks.

Figure 6:
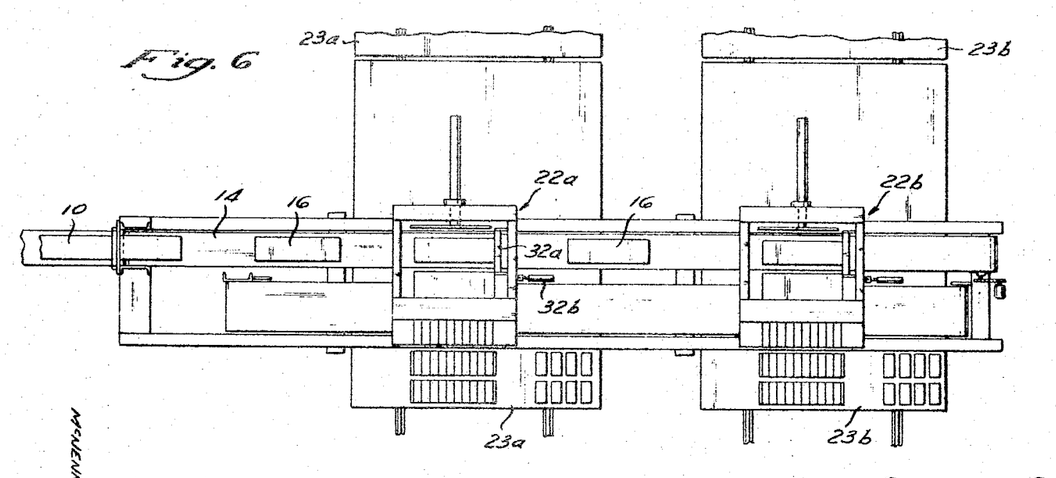
FIGURE 6 is a schematic plan view of a modified form of the embodiment of FIGURES 1 through 5, wherein two cutter and hacker assemblies are provided along a single off-bearing belt and are adapted to simultaneously set two parallel kiln cars.

FIGURE 6 illustrates a modification of the first embodiment wherein a single off-bearing belt 14 extends past two similar cutter and setter carriages 22a and 22b. The two carriages are operated to simultaneously set two kiln cars 23a and 23b. The cutter and setter carriage 22a operates to push alternate slugs 16 off of the off-bearing belt through its cutter for setting on the car 23a. The remaining slugs 16 pass through the carriage to the carriage 22b which subsequently cuts the slugs and sets them on the car 23b. The stop bar 32a is mounted for movement from an operative position wherein it engages and stops alternate slugs being carried along the belt to a retracted position wherein every other slug is permitted to pass onto the carriage 22b. An actuator 32b is connected to move the stop bar 32a between its operative and retracted positions. With this form of machine the pug mill can be operated at higher extrusion rates and higher production rates can be achieved.

Figure 7:
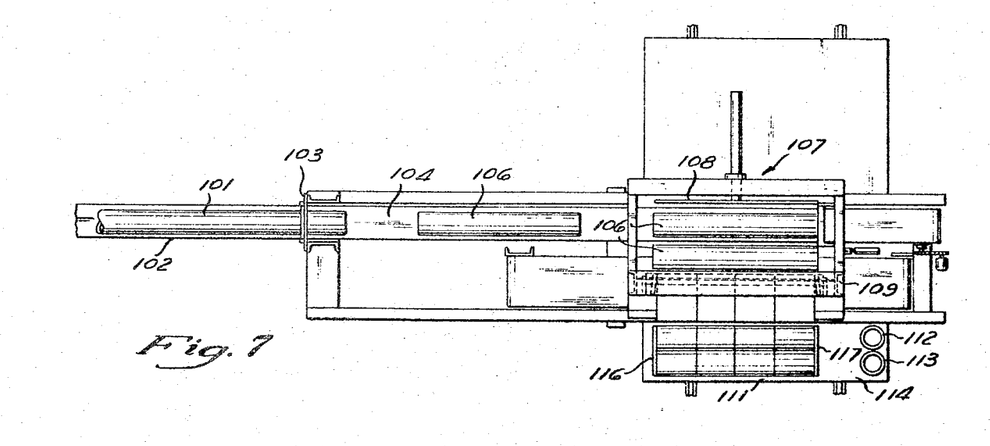

FIGURE 7 illustrates still another modification of the basic machine illustrated in FIGURES 1 through 5. This modified machine is suitable for cutting and setting soil pipe, or the like. Tubular material 101 is extruded across a table 102 through a bow cutter 103 onto an off-bearing belt 104 in a manner similar to the first embodiment. The bow cutter 103 cuts the material into slugs 106 which are carried by the off-bearing belt into a cutter and setter carriage 107. Here again, the rate of movement of the off-bearing belt is faster than the rate of extrusion, so spaces occur between adjacent slugs. Here again, a pusher 108 pushes the slugs through a cutter frame 109 onto a setter assembly 111. The basic structure and the mode of operation of the pusher and the setter is substantially identical to the structure and mode of operation of the embodiment of FIGURES 1 through 5 with the exception that the setter assembly does not provide for spreading of the two columns of cut tile. Since the tile is round spreading is not required for even burning. The two columns 112 and 113 are therefore placed on a kiln car 114 in abutting relationship. Gripping of the columns is provided, during the setting operation, by a clamping plate 116 (operated by a suitable actuator not shown) which presses the columns toward the footplate 117. Here again, the carriage is movable lengthwise of the off-bearing belt by an actuator (not shown) similar to the actuators used in the first embodiment.

FIGURES 9 through 16 illustrate still another embodiment of this invention which is particularly suited for the setting of glazed brick, or the like. In this embodiment the bricks are formed and are glazed along one end and one face before delivery to the machine. The brick are delivered to the machine in a continuous row carried along a conveyor. The machine includes a separator mechanism to form spaced columns each of which includes a predetermined number of brick. In the illustrated embodiment there are nineteen brick in each column. Since the brick are already formed a cutter frame is not required in this machine.

The columns are separately delivered to a setter carriage which automatically operates to invert alternate bricks in such a manner that the glazed edges of each brick in the column are off-set from the adjacent edge. The machine then turns each column on end and positions the columns on a kiln car with the columns resting on their end and arranged in a grid-like maner.

Figure 8:
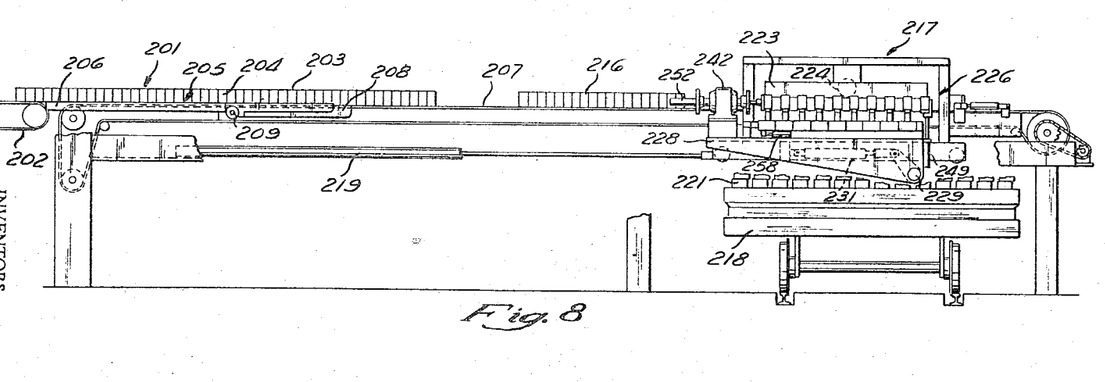
FIGURE 8 is a side elevation of another embodiment of this invention arranged to set columns of glazed brick on a kiln car.
Figure 9:
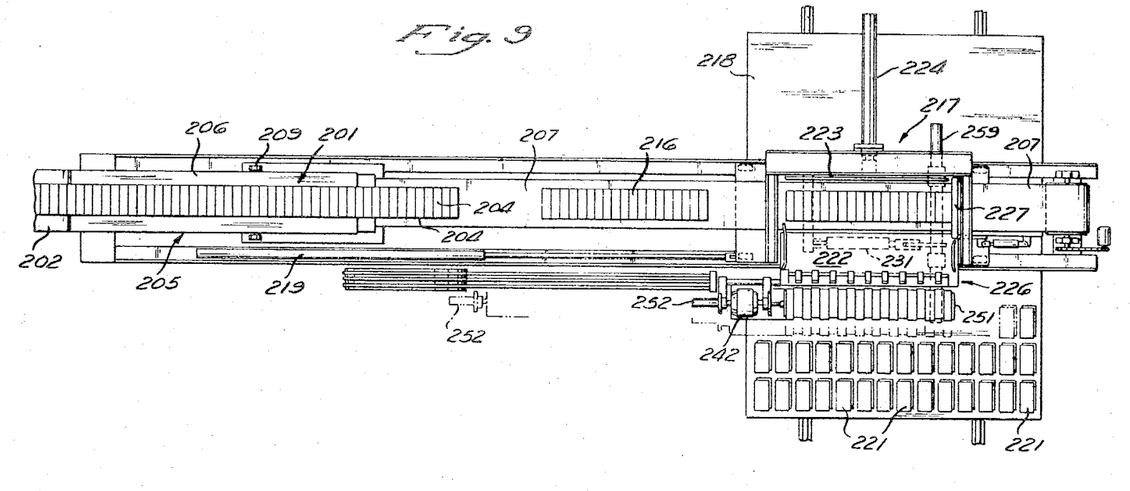
FIGURE 9 is a plan view of the embodiment illustrated in FIGURE 8.

Referring to FIGURES 8 and 9, the glazed brick 201 are delivered to the machine by a conveyor 202. The brick 201 are in abutting alignment and are glazed on one face 203 and one end 204. A separator assembly 205 is provided to form spaced columns 216 which are subsequently delivered to the setter. The assembly 205 includes a stationary plate 206 overlaying one end of an off-bearing belt 207 and a reciprocating plate 208 positioned between the stationary plate 206 and the belt 207 (see FIGURE 10). The plate 208 rests at one end on the off-bearing belt 207 and is carried at its other end by rollers 209 which roll back and forth along guide tracks (not shown) supported by the machine frame.

Figure 10:
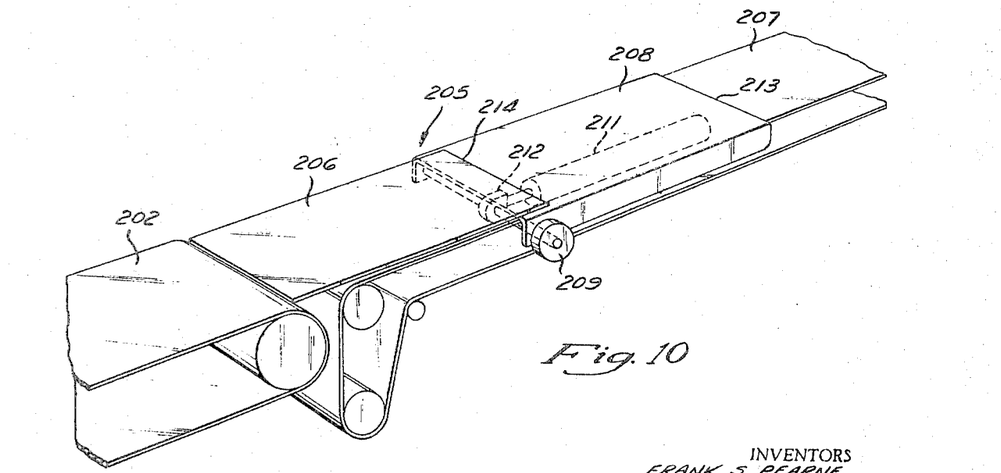
FIGURE 10 is an enlarged, fragmentary, perspective view, with parts broken away, illustrating the apparatus for separating the bricks into columns each consisting of a predetermined number of brick.

An actuator 211 is provided with a piston 212 connected to move the reciprocating plate 208 back and forth between an extended position, illustrated in FIGURE 10, wherein the end 213 of the reciprocating plate 208 is spaced from the end 214 of the stationary plate 206 and a retracted position in which the end 213 is substantially adjacent to the end 214.

The conveyor 202 is operated at a constant speed causing the row of bricks 201 to slide across the stationary plate 206 and the reciprocating plate 208. The off-bearing belt 207, however, is operated at two different speeds. In its slow speed operation it moves at the same rate as the conveyor 202 and in its fast speed of operation it moves at a substantially higher speed. At the beginning of each cycle the reciprocating plate 208 is in its retracted position wherein its end 213 is substantially adjacent to the edge 214 of the stationary plate 206. The actuator 211 is then operated to extend the reciprocating plate 213 to the right, as viewed in the drawings, at the same speed as the speed of the conveyor 202. Consequently, the end brick carried by the reciprocating plate 208 adjacent to the end 213 remains in a fixed position relative to the reciprocating plate while the plate is extending. During this extension movement of the plate, the off-bearing belt 207 is operated at a higher rate of speed to carry away the previously separated column 216. When the reciprocating plate 208 is fully extended the speed of the off-bearing belt 207 is reduced to match the speed of the conveyor 202 and the reciprocating plate 208 is retracted. This causes bricks resting on the reciprocating plate to be transferred to the off-bearing belt. Since the speed of the off-bearing belt is the same as the speed of the conveyor 202, the bricks remain in abutting relationship.

As soon as the reciprocating plate 208 is in its retracted position it again starts to extend at the same speed as the conveyor 202 and at the same time the off-bearing belt is speeded up so that the column of bricks resting thereon moves away to produce a space between the last brick in the column and the adjacent subsequent brick. Such adjacent subsequent brick remains on the reciprocating plate until after the reciprocating plate reaches the extended position and commences to return to the retracted position. Suitable photoelectric cell controls are used to control the operation so that the columns 216 have a predetermined number of bricks.

The embodiment is also provided with a carriage 217 reciprocable lengthwise of the off-bearing belt 207 across a kiln car 218. Here again, an actuator 219 is provided to extend the carriage to a position adjacent the remote edge of the kiln car and thereafter move the carriage 217 in a step-by-step manner to the left as columns 221 are positioned on the kiln car.

The carriage is provided with a table 222 adjacent to and aligned with the off-bearing belt 207 and a pusher 223 operated by an actuator 224 to push columns across the table 222 onto a setter assembly 226. A stop bar 227 extends across the off-bearing belt to locate the columns 216 for engagement by the pusher 223.

Referring now to FIGURES 11 through 14, the setter assembly 226 includes a frame 228 carried by a pivot bar 229. The frame 228 and pivot bar 229 are rotatable about the axis of the bar through ninety degrees from the horizontal column receiving position illustrated to a vertical position. An actuator 231 provides the power for rotating the shaft 229 through the ninety degree arc required.

Figure 12:
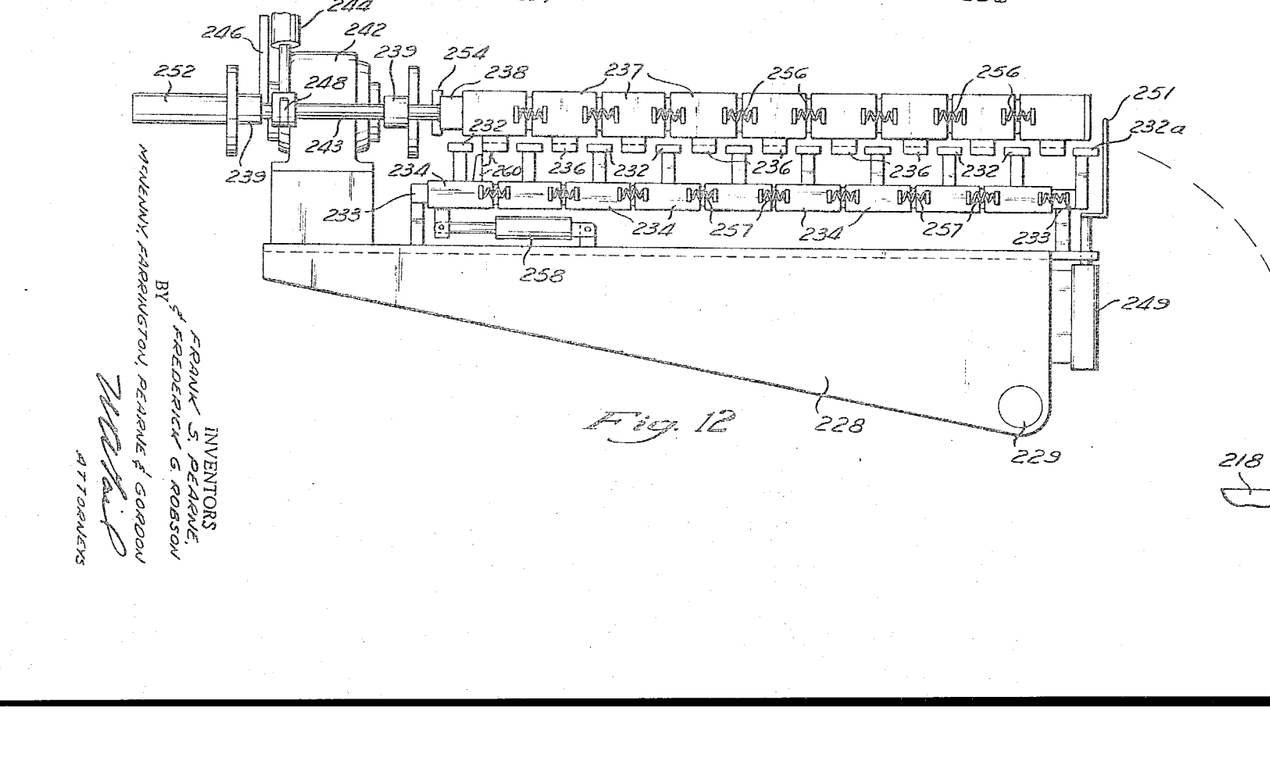
FIGURE 12 is an enlarged, fragmentary, side elevation of the setter assembly of the embodiment of FIGURES 8 and 9.
Figure 13:
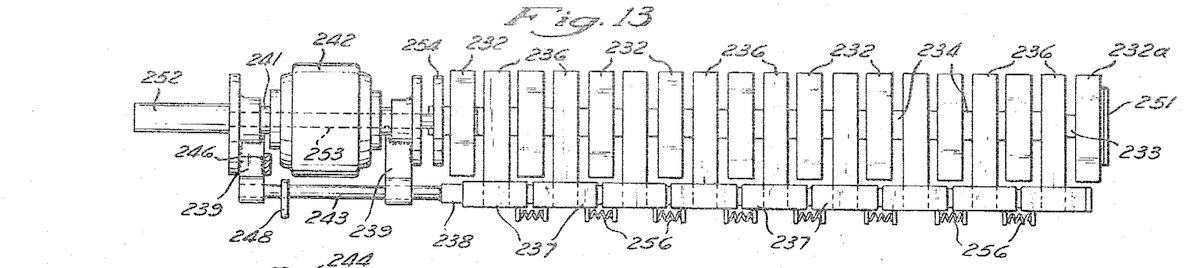
FIGURE 13 is a plan view of the assembly illustrated in FIGURE 12.
Figure 14:
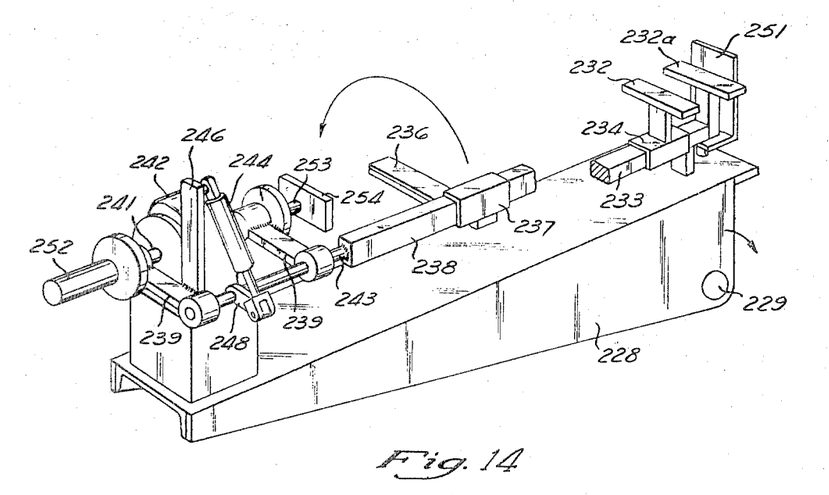
FIGURE 14 is a fragmentary, perspective view of the setter assembly, with parts broken away, illustrating the general structural arrangement of the inverter mechanism.

Mounted on the frame 228 of the setter assembly is an inverter mechanism best illustrated in FIGURES 12 through 14. This mechanism is arranged to receive and support a column 216 when the bricks in the column are in abutting relationship. The mechanism then operates to spread the individual bricks and invert alternate bricks so that every other brick in the column is turned through 180°. During this inversion the alternate bricks are off-set slightly both in a vertical direction and in an endwise direction, so that the glazed surfaces 203 and 204 are spaced from the adjacent bricks. The column is then closed and clamped on its end and the entire setter frame and the column supported thereby is turned to a vertical position immediately over the kiln car 218. The column is then released onto the kiln car and rests upon its end.

The inverter mechanism includes ten non-inverting brick support pads 232 alternated with nine inverting brick support pads 236. The end brick supporting pad 232a at the right end of the inverter, as viewed in FIGURES 12 through 14, is mounted on the end of a horizontal bar 233 supported by the frame 228. This pad 232a is fixed against movement relative to the bar. However, the remaining pads 232 are mounted on sleeves 234 slidable lengthwise of the bar 233, but fixed against all other movement relative to the frame 228. The bar 233 is rectangular in section and the sleeves 234 closely fit the bar.

The inverting pads 236 are each provided with a sleeve 237 slidably supported on a rectangular support bar 238. The support bar 238 is mounted on the end of a support rod 243 which is inturn journaled on arms 239 which extend from the rotatable ouput shaft 241 of a rotary actuator 242. The actuator is operable to rotate the shaft through 180° and thereby swing the support bar 238 through a 180° arc around the axis of the shaft 241 from a column receiving position to an inverted position in which the inverting pads 236 have inverted the bricks resting thereon. Vacuum is supplied to openings in the face of the pads so that the bricks are vacuum gripped.

The proportions of the various elements are arranged so that the axis of the shaft 241 is off-set from the center of a brick resting on the pads 232 below and toward the unglazed end. Therefore, the inverted brick are off-set so that the glazed faces of the bricks gripped on the inverted pads 236 are located below the bottom face of the bricks on the non-inverting pads 232. Also, the glazed end face of the bricks on the inverted pads 236 projects beyond the adjacent end face of the adjacent bricks. Consequently, the glazed face and end of each brick is spaced from the adjacent ends and faces of the adjacent bricks so the glazed surfaces do not cause the bricks to stick together and damage to the glazed faces cannot occur.

During one phase of operation it is necessary to swing the inverting pads 236 clear of the column. This movement is provided by an actuator 244 connected between an upstanding projection 246 on one of the arms 239 and a lateral arm 248 on the bar 243. The actuator 244 is arranged so that when its piston is extended, as illustrated in FIGURE 14, the inverting pads 236 extend parallel to the fixed pads 232. Retraction of the actuator 244 rotates the support beam 238 and the pads 236 clear of the column in a manner which will be discussed in detail below.

Mounted on the end of the frame 228 opposite the actuator 242 is a piston and cylinder actuator 249 which is operable to extend a foot plate 251 into a position aligned with the column of bricks or retract the plate so that the column can be set on the kiln car. A clamping actuator 252 is mounted on the output shaft 241 of the inverting actuator 242 and is provided with a piston rod 253 which extends through the output shaft 241. A clamping pad 254 is mounted on the piston rod 253 and is engageable with the end of the column of brick to press the column against the foot plate 251.

Springs 256 are positioned between adjacent mounting sleeves 237 of the inverting pads 236 and normally bias the pads away from each other to provide spacing between bricks supported thereon. Similar springs 257 extend between adjacent mounting sleeves 234 of the stationary or non-inverting pads 236. These springs operate to normally bias all of the pads apart to a position where the bricks on each pad are spaced from adjacent bricks by about one quarter of an inch.

Actuator 258 is connected to the mounting sleeve 234 of the pad 236 closest to the inverter actuator 242 and is operable to move the mounting sleeves 234 against the action of the springs 257 to a closed position wherein the ends of the respective sleeves abut each other. When the inverting pads 236 are in the column receiving position in alignment with the non-inverting pads 232 the operation of the actuator 258 causes the sleeves 234 to be engaged by the adjacent sleeves and to move to the closed position. Engageable stops 260 on the end sleeves 234 and 237 engage so that the operation of the actuator 258 also closes the inverting pads.

Figure 11:
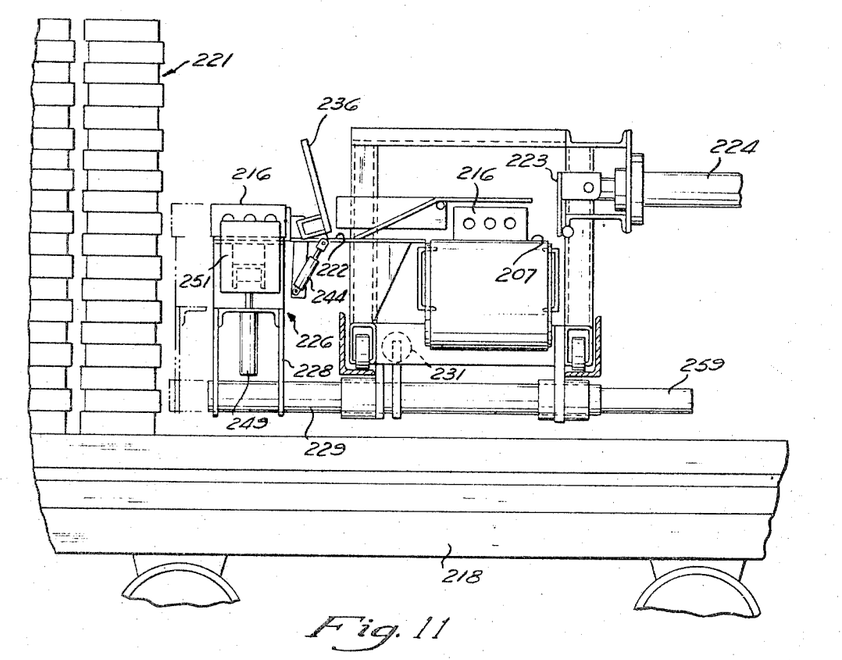
FIGURE 11 is an enlarged, fragmentary, side elevation, with parts broken away, illustrating the structural arrangement at the inverter and setter location.

Referring to FIGURE 11, the entire setter carriage assembly is movable in a direction toward and away from the table 22 by an actuator 259 connected to slide the support shaft 229 to the left from the full line position to the phantom line position. The purpose of this movement is to provide clearance for the support arm 238 when the inverting pads 236 are in the column receiving position.

Figure 15:
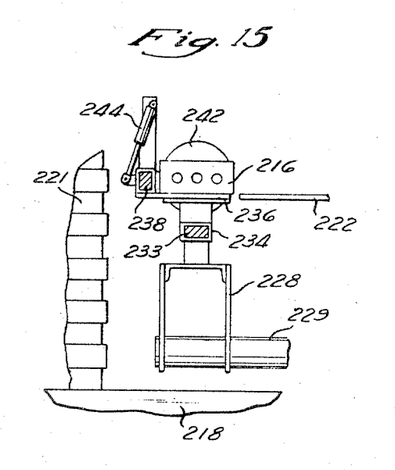
FIGURE 15 is a schematic, fragmentary view illustrating the setter assembly in the position in which it receives a column of glazed brick; and, FIGURE 16 is a view similar to FIGURE 15 illustrating the position of the elements after inversion of alternate bricks in the column.
Figure 16:
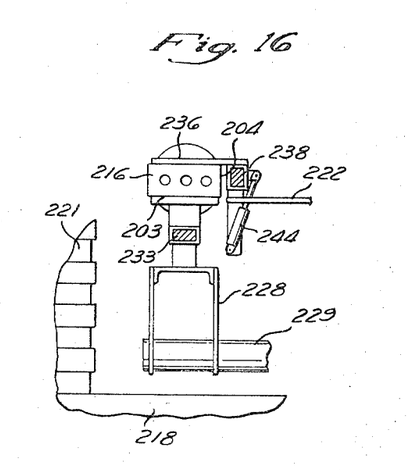

The operation of the inverting and setting is as follows. When a column 216 engages the stop bar 227 (illustrated in FIGURE 9) the pusher actuator 224 is operated to extend the pusher 223 and slide the column across the table 222 and onto the pads 232 and 236. At this time the inverter actuator 242 has positioned the inverting pads 236 in alignment with the fixed pads 232, the actuator 244 is extended and the closing actuator 258 is retracted to position the pads in substantially abutting relationship. At the completion of the operation of the pusher 223 the column 216 is located on the inverter mechanism (as illustrated in FIGURE 15) with one brick positioned on each pad. As soon as this operation is completed vacuum is applied to grip the brick and the closing actuator 258 is extended allowing the springs 256 and 257 to spread the pads and produce a uniform spacing of about one quarter of an inch between adjacent bricks. The inverting actuator is then operated to rotate the support bar 238 from the position of FIGURE 15 to the position of FIGURE 16, so that alternate bricks resting on the inverting pads 236 are turned through 180°. During this movement which occurs around an axis spaced slightly from the center of the brick, a staggering or off set relationship is obtained wherein a glazed face 203 is positioned below the bottom of the adjacent bricks and the glazed end face 204 is positioned to the right (as illustrated in FIGURE 16) of the right end face of the uninverted brick.

After the inversion is completed the clamping actuator 252 is operated to clamp the bricks between the clamping pad 254 and the toe plate 251. The actuator 259 is extended to move the entire setter carriage 226 to the phantom line position of FIGURE 11 and the actuator 244 is retracted to tip the inverting pads 236 up clear of the column. The vacuum is released from the pads 236 prior to the operation of the actuator 244, but since the bricks are clamped on their ends the column remains stable. If desired, the vacuum applied to the non-inverting pads 232 may be maintained to improve control of the column during the movement of the setter to the vertical position.

The actuator 231 is then extended to rotate the entire setter assembly 226 to position the column upright immediately above the kiln car 218. The toe plate actuator 249 is then operated to retract the toe plate 251 allowing the column to drop a fraction of an inch, so that it rests on the kiln car. The various actuators are then operated to return the inverter pads to the column receiving position after which the cycle is repeated. Between cycles the actuator 219 retracts to the next position, so that a subsequent column is properly located on the kiln car. The operation is repeated until a full row of bricks or columns is positioned across the kiln car. After this occurs a car indexing mechanism of the type illustrated in the first embodiment moves the kiln car forward and the setter carriage extends so that the next column can be set.

Although preferred embodiments of this invention are illustrated it is to be understood that various modifications and rearrangements of parts may be resorted to without departing from the scope of the invention as defined in the following claims.

What we claim is:

1. A machine for handling columns of similar articles such as brick or the like comprising a transfer assembly movable between a first position in which it is adapted to receive at least two abutting columns of articles and a second position substantially ninety degrees of rotation from said first position in which it is adapted to release said columns, said transfer assembly including support means to support at least two abutting columns of articles, means connected to said transfer assembly and support means for spreading said columns a predetermined distance apart before releasing them in said position, said transfer assembly including gripping means to grip said columns in said first position and hold such columns as it pivots to said second position, said gripping means thereafter releasing said columns onto a platform while in said second position, said columns resting on their ends in one position and on their sides in the other position.

2. A machine as set forth in claim 1 including means for forming said column, and means to move said columns onto said transfer assembly.

3. A machine for handling a column of similar articles such as brick or the like comprising a transfer assembly movable between a first position in which it is adapted to receive a column of articles and a second position substantially ninety degrees of rotation from said first position in which it is adapted to release said columns, said transfer assembly including gripping means to grip said column in said first position and hold such column as it pivots to said second position, said gripping means thereafter releasing said column onto a platform while in said second position, said column resting on its end in one position and on its side in the other position, said transfer assembly includes inverting means operable to invert alternate articles in said columns.

4. A machine as set forth in claim 3 wherein said inverting means also offsets said alternate articles during the inversion thereof.

5. A machine for placing a plurality of elongated columns on a platform which is movable in a predetermined direction so that they rest on their ends comprising conveyor means extending above said platform in a direction substantially perpendicular to said predetermined direction, a carriage movable lengthwise of said conveyor laterally with respect to the direction of movement of said platform, setter means pivoted on said carriage for rotation through substantially ninety degrees from a receiving position to a setting position, said setter being adapted in its receiving position to receive a column resting on its side and being operable to turn such column to an upright position with one end adjacent to said platform and release such column so that it rests on its ends on said platform, transfer means operable to move a column from said conveyor onto said setter, and actuating means operable to move said carriage along said conveyor means so that columns are sequentially positioned on said platform at spaced positions across said platform while said platform while said platform remains in a fixed position.

6. A machine as set forth in claim 5 wherein said setter means is operable to receive two abutting columns and spread them apart a predetermined distance before releasing them onto said platform.

7. A machine as set forth in claim 5 wherein said columns received by said setter means each include a plurality of similar articles in abutting relationship.

8. A machine as set forth in claim 7 wherein said setter means includes gripping means operable to hold said articles until they are released onto said platform.

9. A machine as set forth in claim 8 wherein said setter means includes inverter means to invert and offset alternate articles in each column.

10. A machine as set forth in claim 5 wherein said actuating means moves said carriage so that a predetermined spacing is provided between adjacent columns placed on said platform.

11. A machine as set forth in claim 5 wherein indexing means are provided to move said platform in a direction substantially perpendicular to the direction of carriage movement.

12. A machine as set forth in claim 5 wherein a substantially continuous row of similar articles in abutting relationship are supplied to said conveyor means, and said conveyor means includes separator means operable to form said articles into columns each including a predetermined number of articles in abutting relationship with each column spaced from the adjacent column.

References Cited

UNITED STATES PATENTS 2,979,872  4/1961  Verrinder.
3,050,198  8/1962  Schmunk _______________ 214—7
2,249,201  7/1941  Ferguson.

FOREIGN PATENTS 846,546  8/1960  Great Britain.

J. SPENCER OVERHOLSHER, Primary Examiner

DeWALDEN W. JONES, Assistant Examiner

U.S. Cl. X.R.

25—2, 105; 83—102; 146—78; 214—1